(12) United States Patent
Datz et al.

(10) Patent No.: US 9,676,323 B2
(45) Date of Patent: Jun. 13, 2017

(54) SYSTEM FOR MOUNTING A LAMP WITH RESPECT TO A SURFACE OF A VEHICLE

(71) Applicant: STAR HEADLIGHT & LANTERN CO., INC., Avon, NY (US)

(72) Inventors: R. Michael Datz, Rochester, NY (US); James Cronmiller, Henrietta, NY (US); Michael A. Barbato, Webster, NY (US)

(73) Assignee: STAR HEADLIGHG & LANTERN CO., INC., Avon, NY (US)

( * ) Notice: Subject to any disclaimer, the term of this patent is extended or adjusted under 35 U.S.C. 154(b) by 111 days.

(21) Appl. No.: 14/198,305

(22) Filed: Mar. 5, 2014

(65) Prior Publication Data

US 2014/0293637 A1 Oct. 2, 2014

Related U.S. Application Data

(60) Provisional application No. 61/773,123, filed on Mar. 5, 2013.

(51) Int. Cl.
*F21V 5/00* (2015.01)
*B60Q 1/26* (2006.01)

(52) U.S. Cl.
CPC .......... *B60Q 1/2696* (2013.01); *B60Q 1/263* (2013.01); *B60Q 1/2615* (2013.01); *B60Q 1/2626* (2013.01); *B60Q 1/2653* (2013.01)

(58) Field of Classification Search
CPC .... B60Q 1/2653; B60Q 1/263; B60Q 1/2626; B60Q 1/2696
See application file for complete search history.

(56) References Cited

U.S. PATENT DOCUMENTS

| | | | |
|---|---|---|---|
| 6,302,569 B1 * | 10/2001 | Huang | B60Q 1/2626 362/368 |
| 6,431,728 B1 * | 8/2002 | Fredericks | B60Q 1/2696 340/901 |
| D530,437 S | 10/2006 | Neufeglise et al. | |
| D693,035 S | 11/2013 | Datz et al. | |

(Continued)

OTHER PUBLICATIONS

Truck-Lite Co., LLC, 2011 Full Line Catalog, pp. 4-24 and 224-257, 2011.

(Continued)

*Primary Examiner* — Andrew Coughlin
(74) *Attorney, Agent, or Firm* — Kenneth J. Lukacher Law Group

(57) ABSTRACT

A system is provided for mounting a lamp having a plurality of different types of mounting members. One of the mounting members is a rigid tray mountable by fasteners flush upon a surface of a vehicle to enable an on-surface mounting mode, and other of said mounting members, such as a grommet or bracket, are mountable at least partially in an opening or hole when present along such surface of a vehicle to enable an inset mounting mode. The different mounting members each engage a common shape housing of the lamp, such as round or oval, so that by selection of one of the mounting members, on-surface or inset mounting of the lamp can readily be achieved. One or more common engagement features are provided along the housing to facilitate engagement of the housing of the lamp by mounting members in on-surface and inset mounting modes.

26 Claims, 28 Drawing Sheets

(56) References Cited

U.S. PATENT DOCUMENTS

D712,086 S      8/2014   Barbato et al.
2003/0035300 A1*   2/2003   Branstetter .......... B60Q 1/2638
                                                                          362/549

OTHER PUBLICATIONS

Truck-Lite Co., LLC, 2011 Signal-Stat LED Lighting Catalog, 2011.
Star Headlight & Lantern Co., Inc., LED PAR36, 2012.
Truck-Lite Co., LLC, 2012 New Product Supplement, 2012.

* cited by examiner

SYSTEM FOR MOUNTING A LAMP WITH RESPECT TO A SURFACE OF A VEHICLE

This application claims the benefit of priority to U.S. Provisional Patent Application No. 61/773,123, filed Mar. 5, 2013, which is herein incorporated by reference.

FIELD OF THE INVENTION

The present invention relates to a system for mounting a lamp with respect to a surface along a vehicle, and more particularly to, a system having different mounting members each adapted to receive a common shape of the lamp's housing, where such mounting members enable different mounting modes with respect to a surface of a vehicle. For example, one type of mounting member facilitates a flush on-surface mounting mode, while other types of mounting members facilitate an inset mounting mode via an opening or hole in a surface of a vehicle. This invention is advantageous by avoiding the need for lamps of the same optical design requiring different housings to accommodate different mounting applications to vehicles.

BACKGROUND OF THE INVENTION

Lamps, such as of Par 36 type, provide signaling and warning functions for vehicles, such as buses, trucks, locomotives, or planes. These lamps have housings designed to be received in fixtures or brackets mounted in a hole drilled in an external surface of a vehicle's body. Wires from the lamp may then be connected to the vehicle's electronics to supply power and function control. Such inset mounting of a lamp may be acceptable where a vehicle's body can accommodate a hole for receiving the lamp and its mounting fixture; however, often this is not the case and the lamp must be on-surface mounted instead (or if otherwise considered more desirable than inset mounting). This necessitates use of an entirely different lamp model having a housing designed for an on-surface mounting fixture. As a result, lamps having the same optical design require two different housing configurations, one for each different type of mounting modes, e.g., inset surface mounted or on-surface mounted, as desired for the particular vehicle applications. It would thus be desirable to provide a lamp having a housing that can be mounted to a vehicle regardless of the mounting mode needed, thus avoiding manufacturing lamps of the same optical design having different housings to accommodate different mounting modes.

SUMMARY OF THE INVENTION

Accordingly, it is an object of the present invention to provide a system having different mounting members for mounting a lamp with respect to a surface in different modes in which each of the mounting members is adapted to receive a common shaped housing of the lamp.

Another object of the present invention is to provide a lamp having a housing with one or more features that enable engagement with different mounting members for mounting the lamp with respect to a surface.

Briefly described, the system embodying the present invention has a plurality of different types of mounting members. One of the mounting members is mountable flush upon a surface of a vehicle to enable an on-surface mounting mode, and one or more other of the mounting members are each mountable at least partially in an opening or hole when present along such surface of a vehicle to enable an inset mounting mode. The different mounting members each engage a common shape housing of the lamp, such as round or oval, so that by selecting one of the mounting members on-surface or inset mounting of the lamp can readily be achieved.

In addition to the different mounting members being sized to receive the common lamp housing, the housing has one or more common features along its outer periphery to facilitate engagement with each of the different mounting members. Such one or more engagement features may be provided by a continuous flange or projecting ridge extending along the curved sides of the housing of the lamp. The flange represents a single or multiple engagement features depending on whether the entire flange, or multiple sections (or arcs) thereof, are used by the particular mounting member to retain the lamp housing. For example, a mounting member may have clip members disposed to capture the housing along sections of the flange at different locations around the housing when the housing is properly located in the mounting member, or a mounting member may be of elastomeric material so as to deform to engage the outer periphery of the housing, including the entire flange, when pressed into the mounting member.

In the preferred embodiment, the mounting member providing on-surface mounting is a tray of rigid material having an interior surface with clip members for engaging the flange at different locations along the housing of the lamp, thereby retaining the housing of the lamp in the tray. A deformable member between the bottom of the tray and the housing of the lamp is provided for biasing the housing of the lamp forward to facilitate the clip members engagement with such flange. The tray may be fixable upon the surface of a vehicle by one or more fasteners through holes in such surface provided for extending such fasteners. A flexible member of sealing material is provided between the tray and the surface of the vehicle when fixed upon the surface of the vehicle. The bottom of the tray has an opening through which one or more wires from the lamp extend to a hole in the surface of the vehicle provided for extending such wires. The on-surface mode mounting member provided by such tray thus maintains the lamp upon a surface of a vehicle and disposed over such surface so that light from the lamp, such as from LED light sources therein, may be emitted from a front surface of the housing of the lamp. The front surface may have lens or lenses for shaping such light as typical of a vehicular lamp.

In the preferred embodiment, the mounting member providing inset mounting mode may be a grommet or a bracket. The grommet is of elastomeric material having an interior surface which frictionally engages an outer periphery, including the above-described flange, of the lamp housing, and an exterior surface which frictionally engages the opening or hole when present in the surface of the vehicle. The bracket has interior clip members which engage the back of the lamp housing, and exterior clip members for engaging the surface about the opening or hole when present in the surface of the vehicle. The grommet or bracket thus maintains the lamp in such hole or opening so that light may be emitted from the lamp via the front surface of the housing of the lamp. Each of these inset mode mounting members may have a front or upper portion which covers or frames along the edge of the opening or hole in the vehicle when the rest or rear of the mounting member is received in such opening or hole.

BRIEF DESCRIPTION OF THE DRAWINGS

The foregoing and other objects features and advances of the invention will become more apparent from a reading of the following description in connection with the accompanying drawings in which.

DETAILED DESCRIPTION OF THE INVENTION

Figure 1:
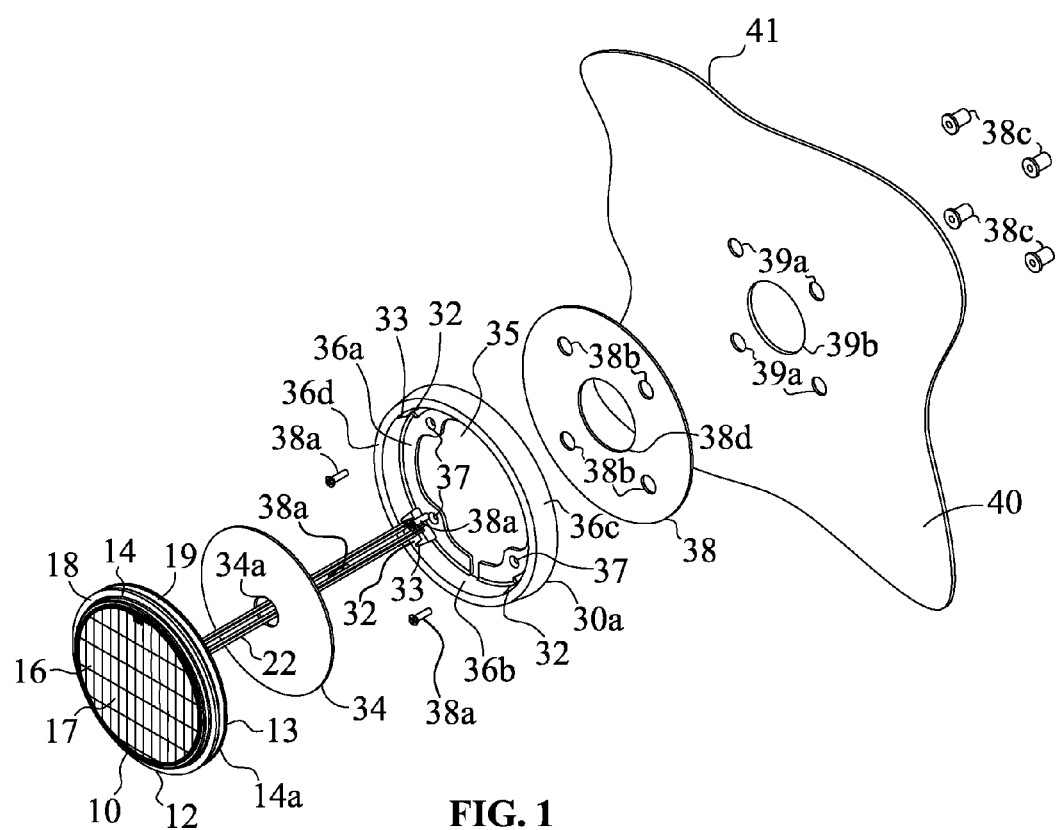
FIG. 1 is an exploded perspective view showing a mounting member for on-surface mounting of a lamp upon a surface of a vehicle in an example of a round shaped housing for the lamp.
Figure 2:
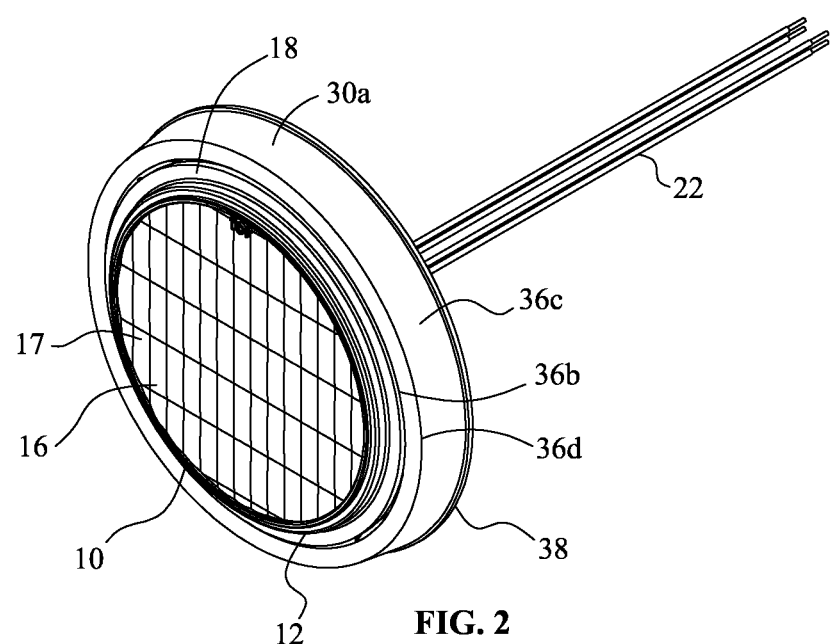
FIGS. 2 and 3 are perspective and front views, respectively, showing the assembly of the lamp received in the mounting member of FIG. 1, in which the surface of the vehicle is not shown in FIG. 2.
Figure 4:
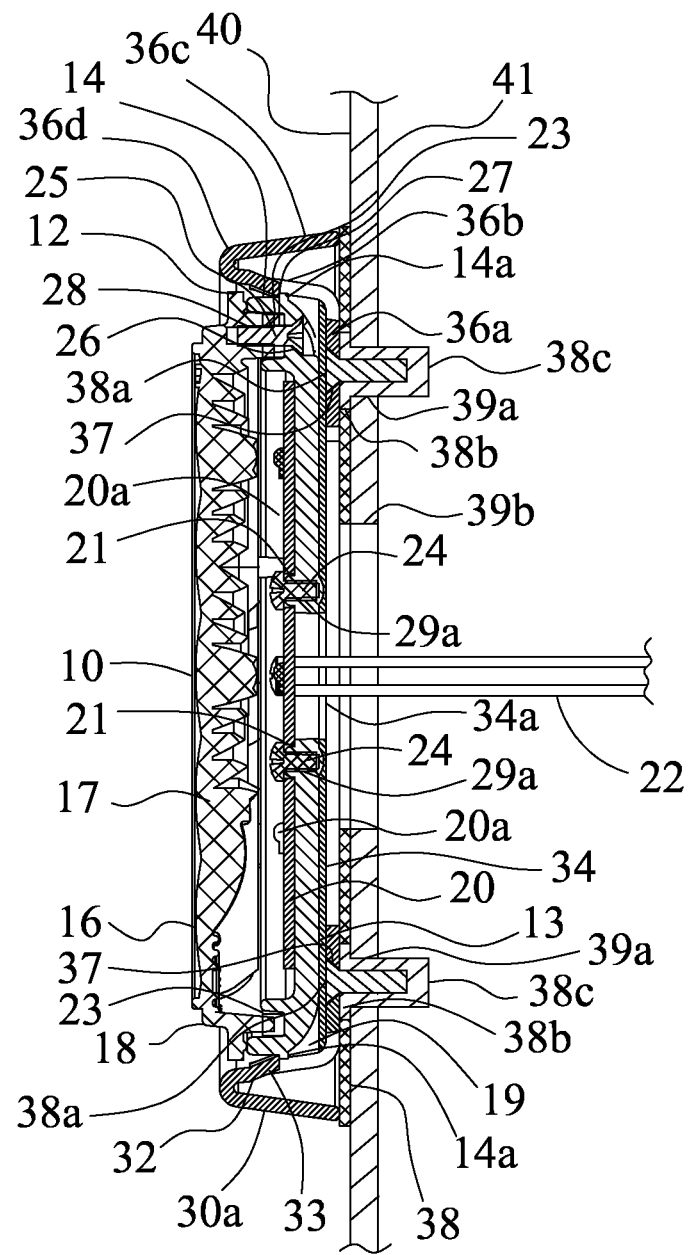
FIG. 4 is a cross-sectional view of the assembly of FIG. 3 along the lines 3A-3A when on-surface mounted.
Figure 5:
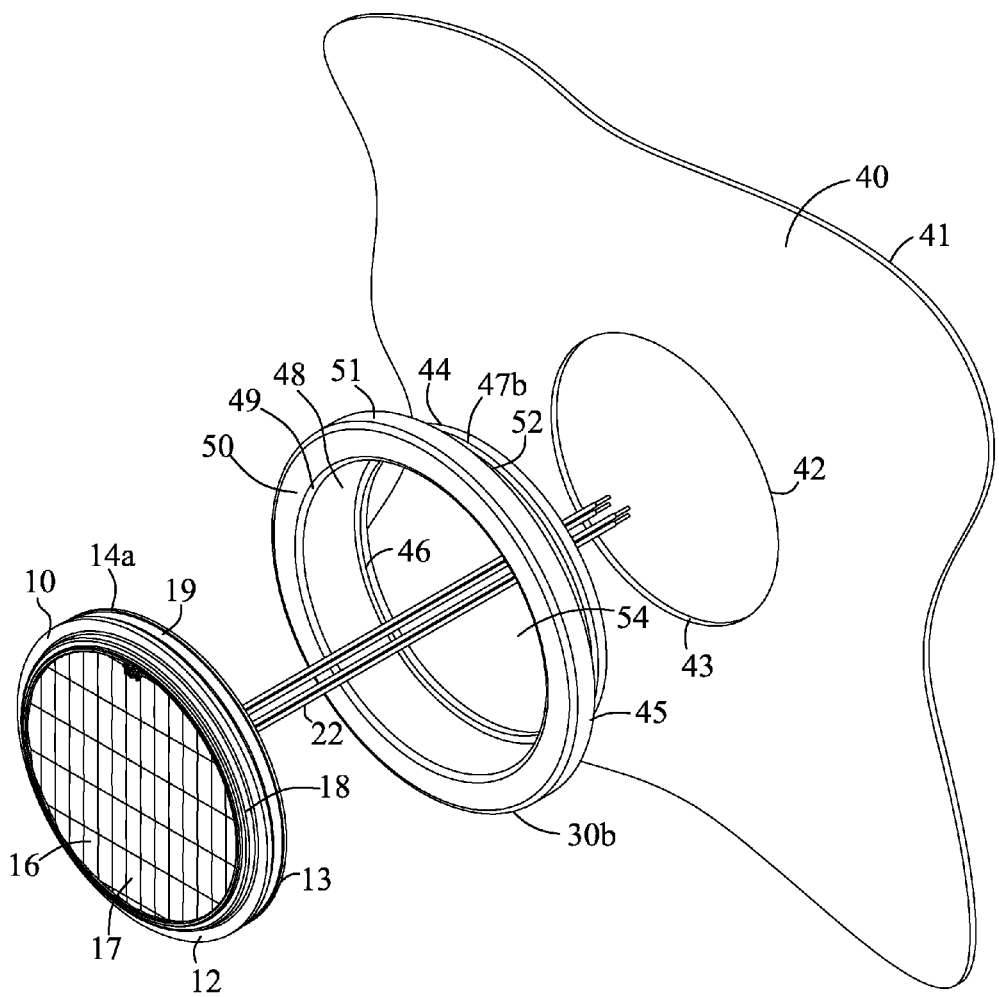
FIG. 5 is an exploded perspective view showing a mounting member for inset mounting of the same lamp as shown in FIGS. 1-4 in a opening or hole extending through a surface of a vehicle.
Figure 8:
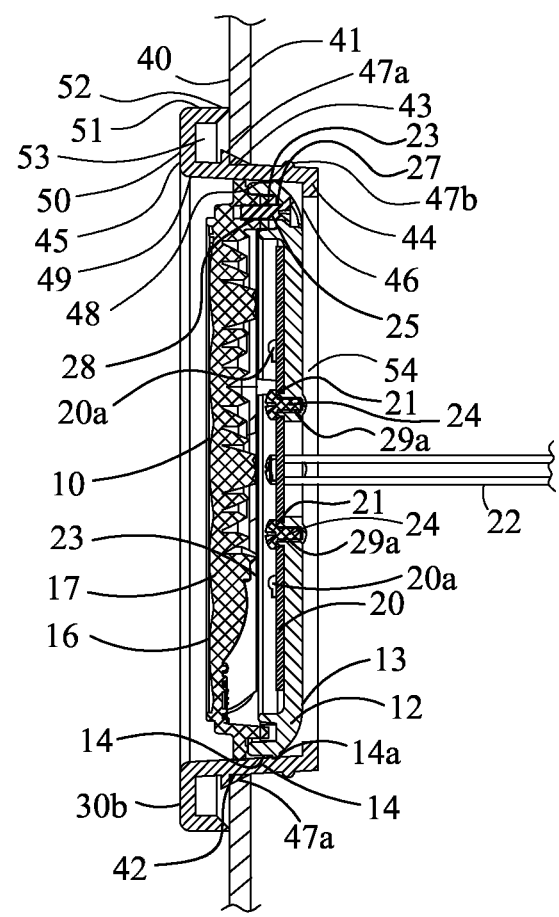
FIG. 8 is a cross-sectional view of the assembly of FIG. 7 along the lines 7A-7A which includes also the surface into which the lamp is being in-set mounted by the mounting member of FIG. 5.
Figure 9:
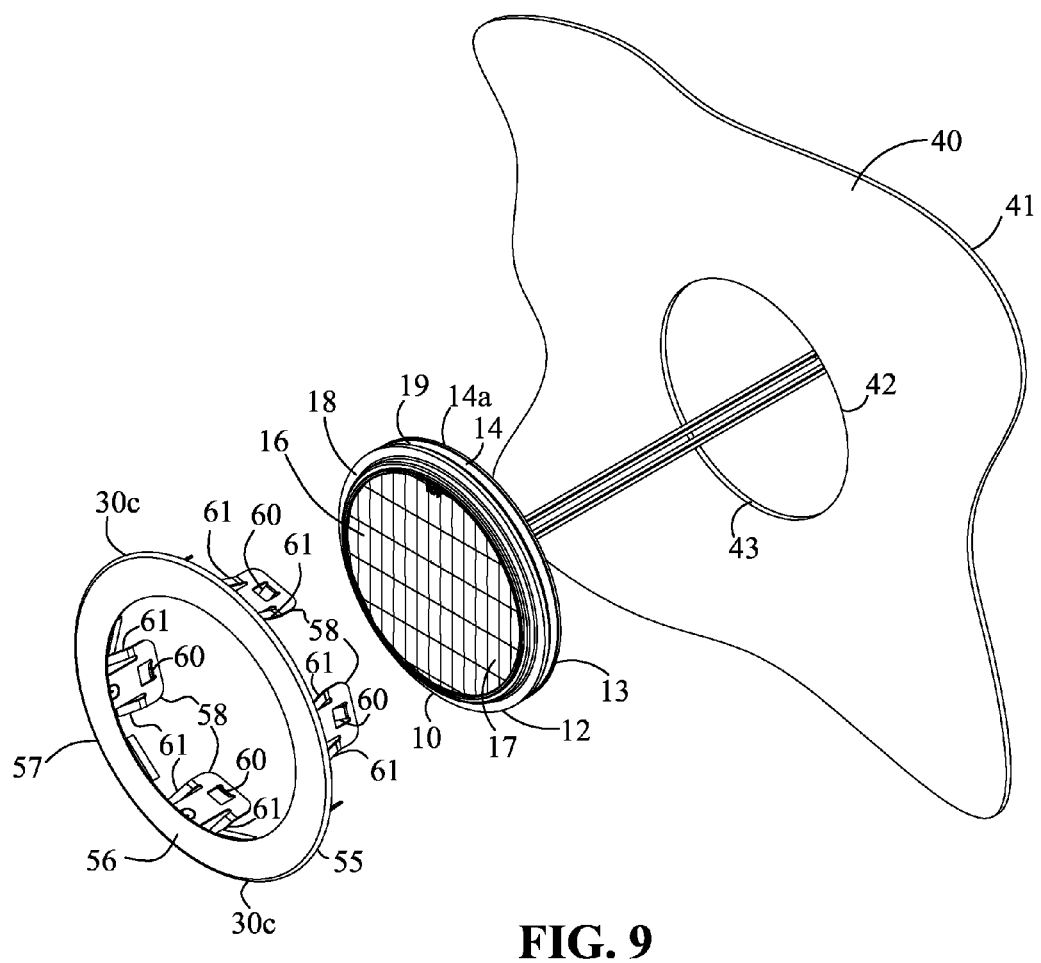
FIG. 9 is an exploded perspective view showing another mounting member for inset mounting of the same lamp as shown in FIGS. 1-4 in a opening or hole extending through a surface of a vehicle.
Figure 10:
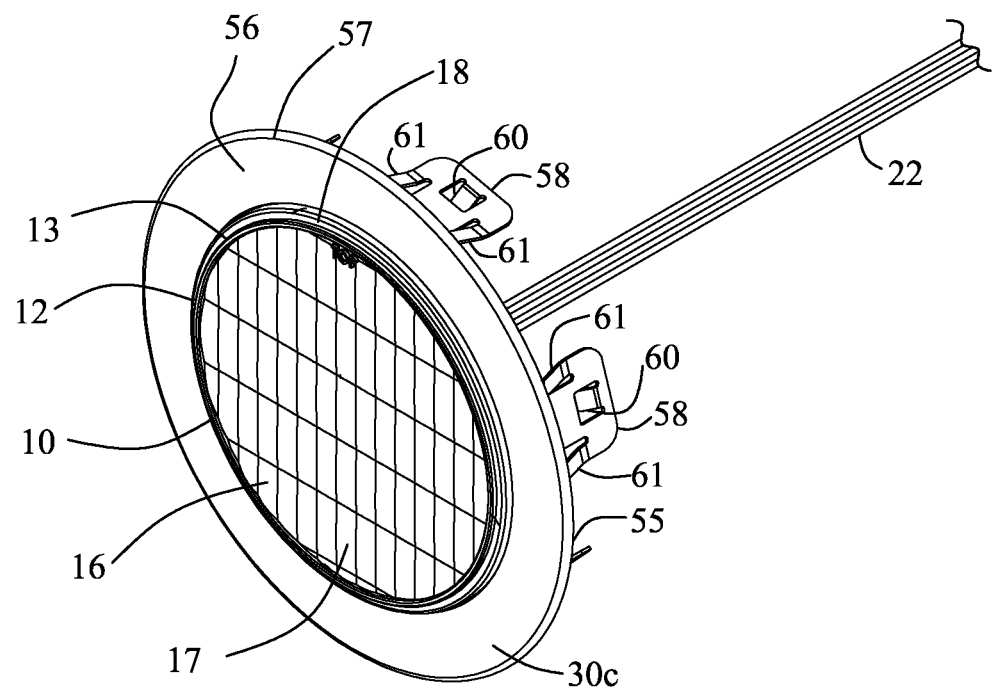
FIGS. 10 and 11 are perspective and front views, respectively, showing the assembly of the lamp received in the mounting member of FIG. 9.
Figure 11:
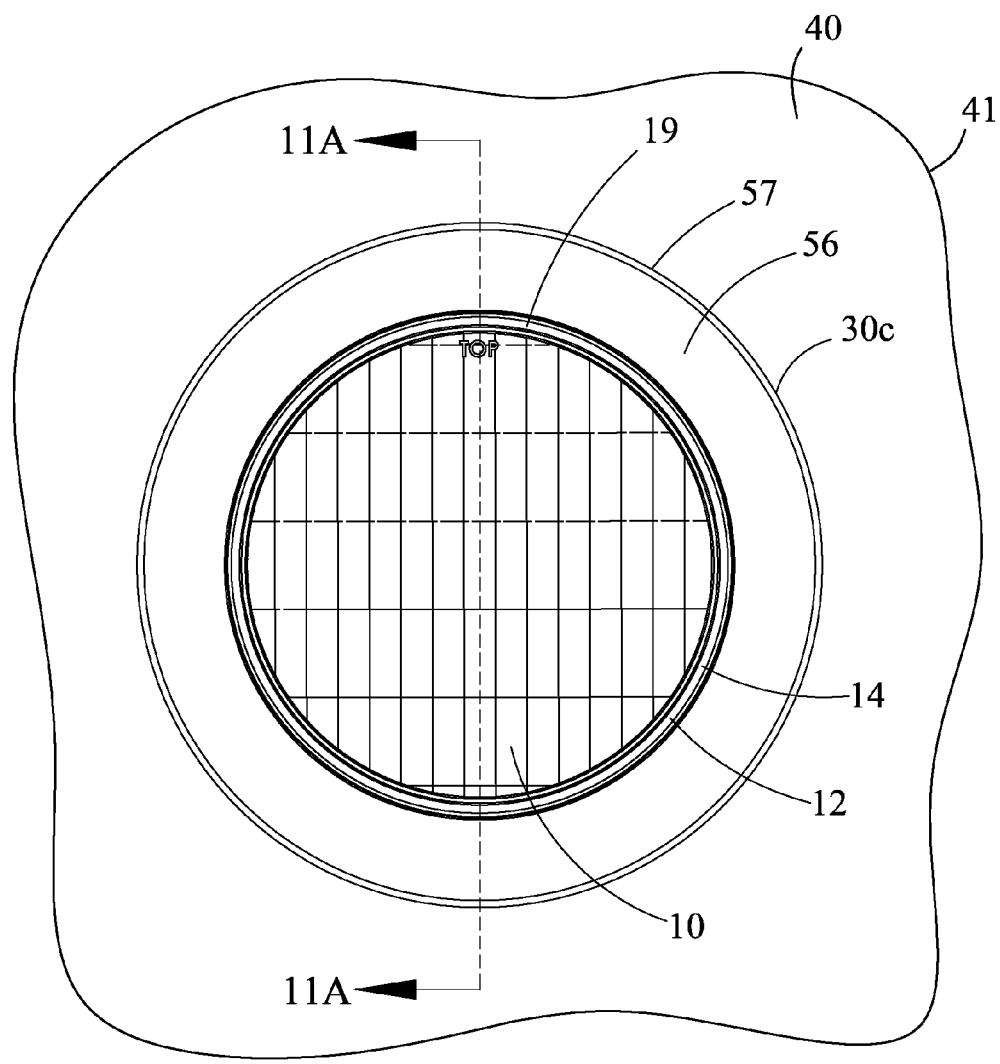
Figure 12:
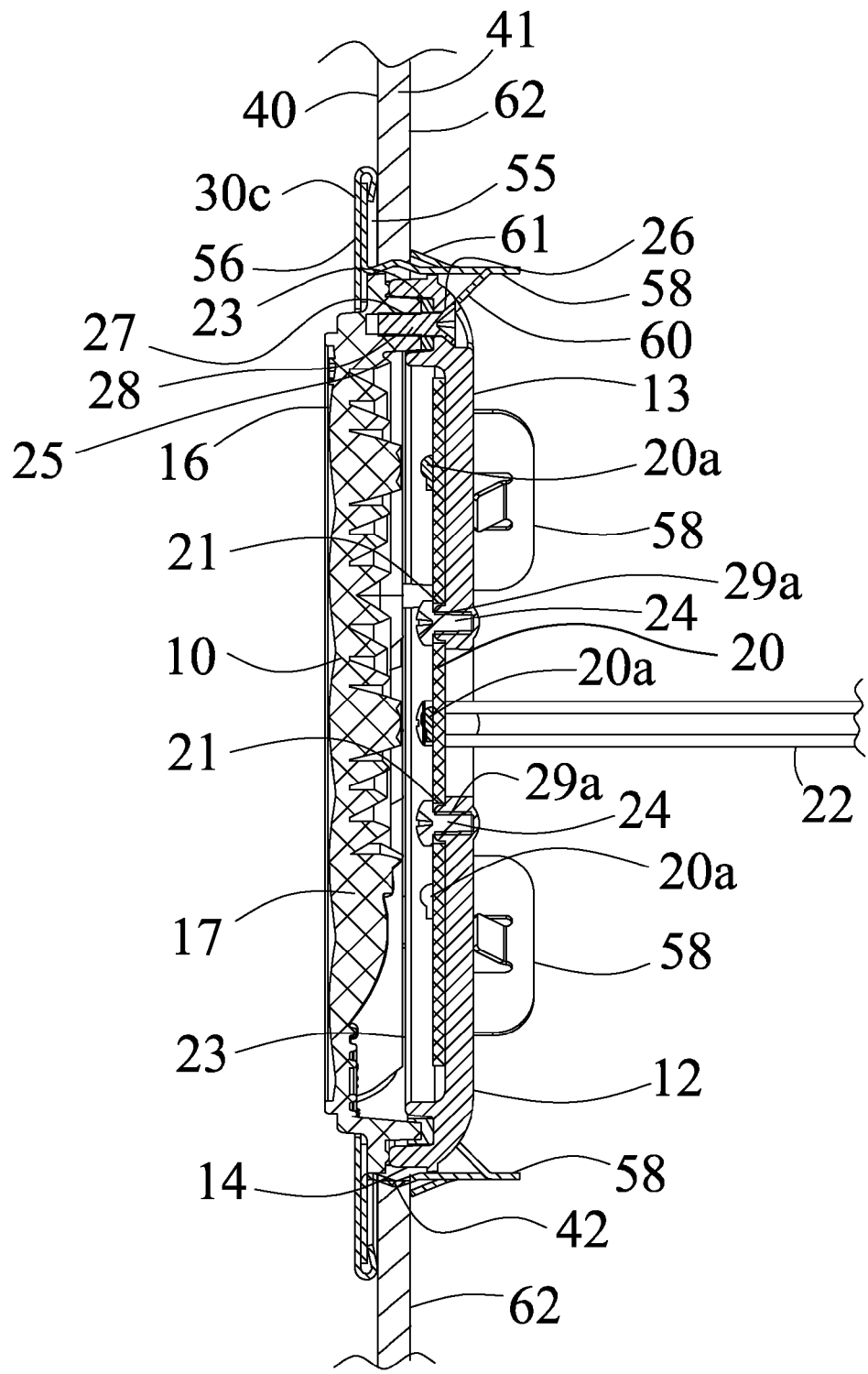
FIG. 12 is a cross-sectional view of the assembly of FIG. 11 along the lines 11A-11A which also includes a surface into which the lamp is being in-set mounted by the mounting member of FIG. 9.
Figure 13:
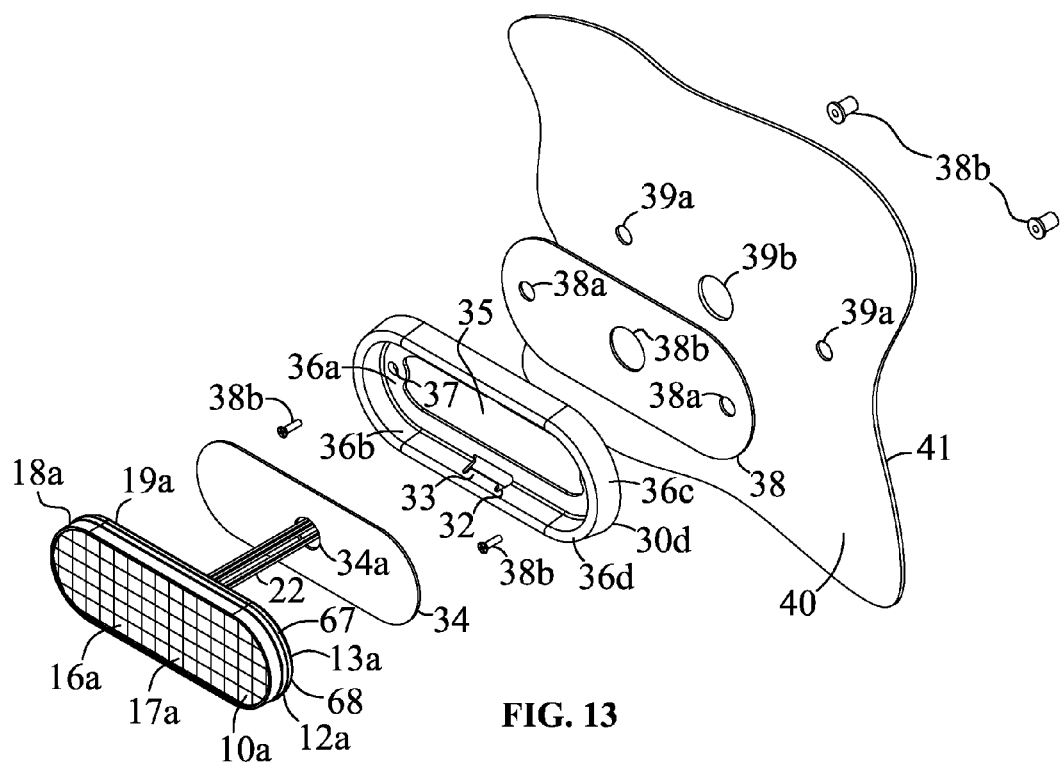
FIGS. 13-17 are similar views to FIGS. 1-4 and 4A, respectively, showing another mounting member which is similar to the on-surface mode mounting member of FIGS. 1-4, but for the an example of a oval shaped housing for the lamp.
Figure 14:
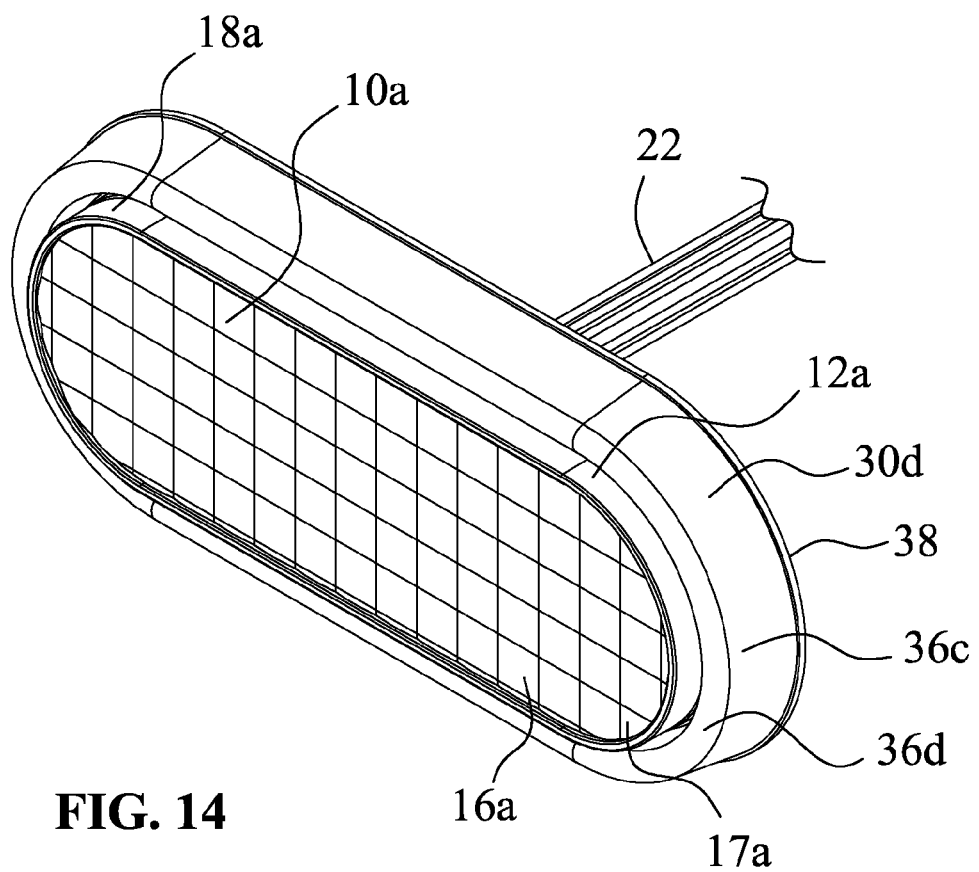
Figure 15:
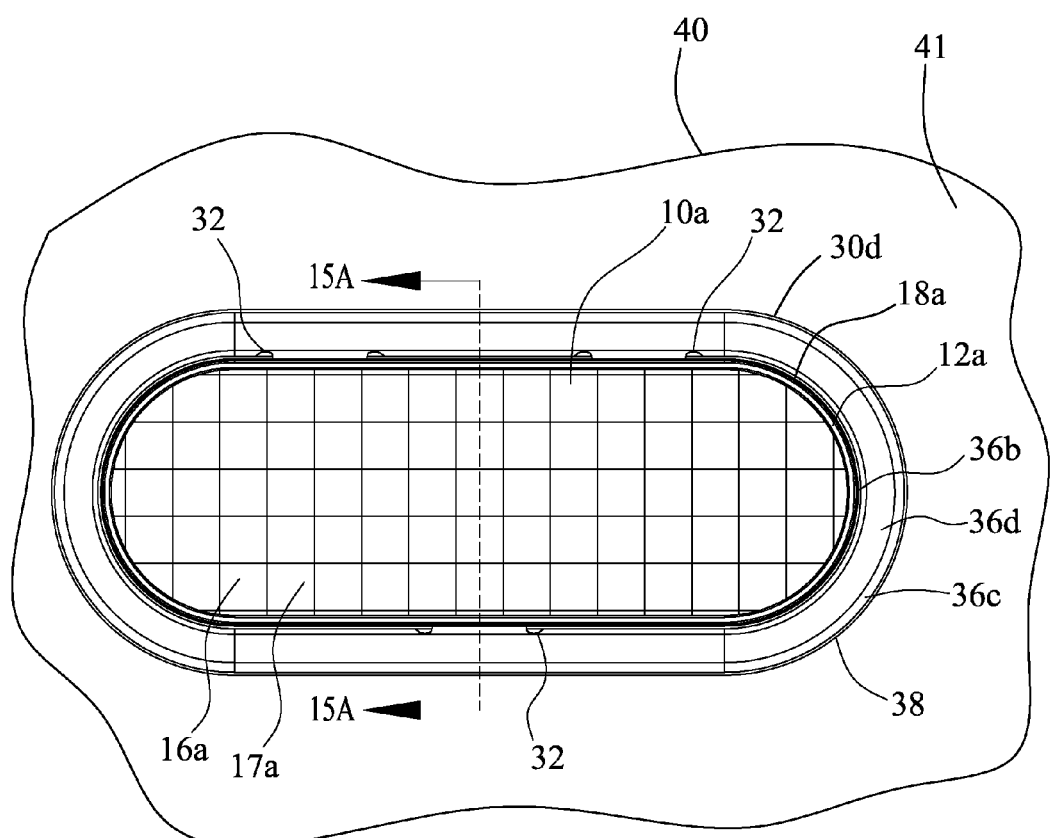
Figure 16:
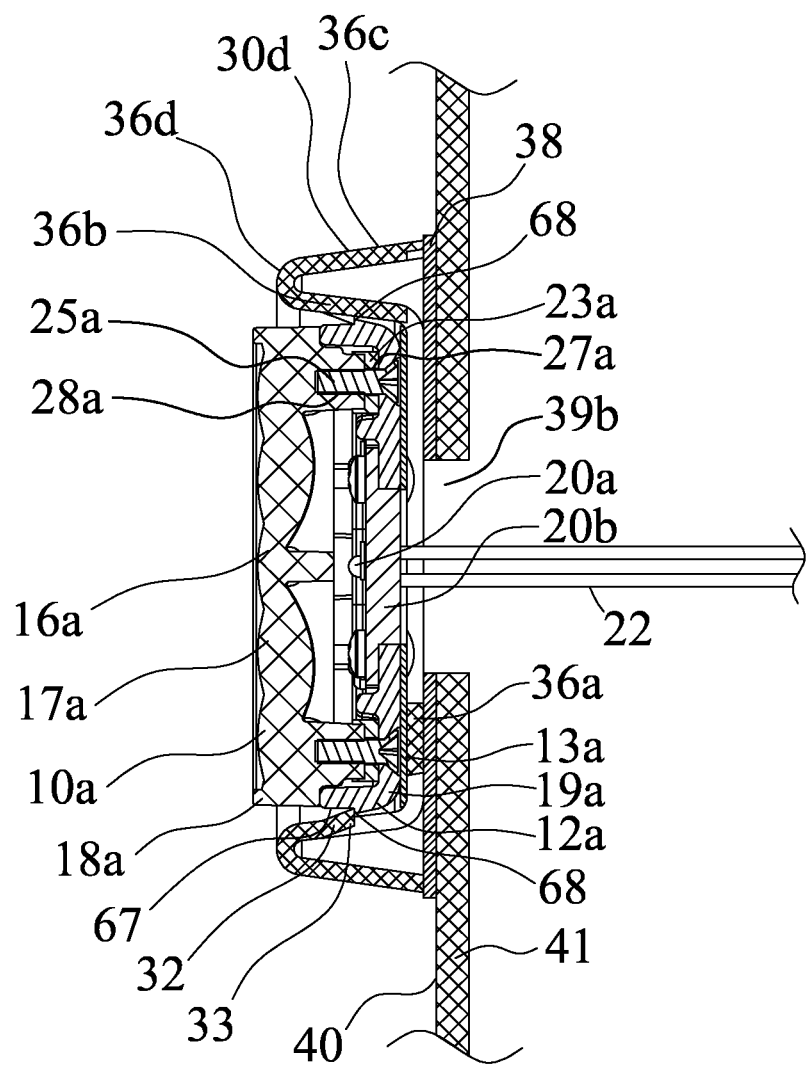
Figure 26:
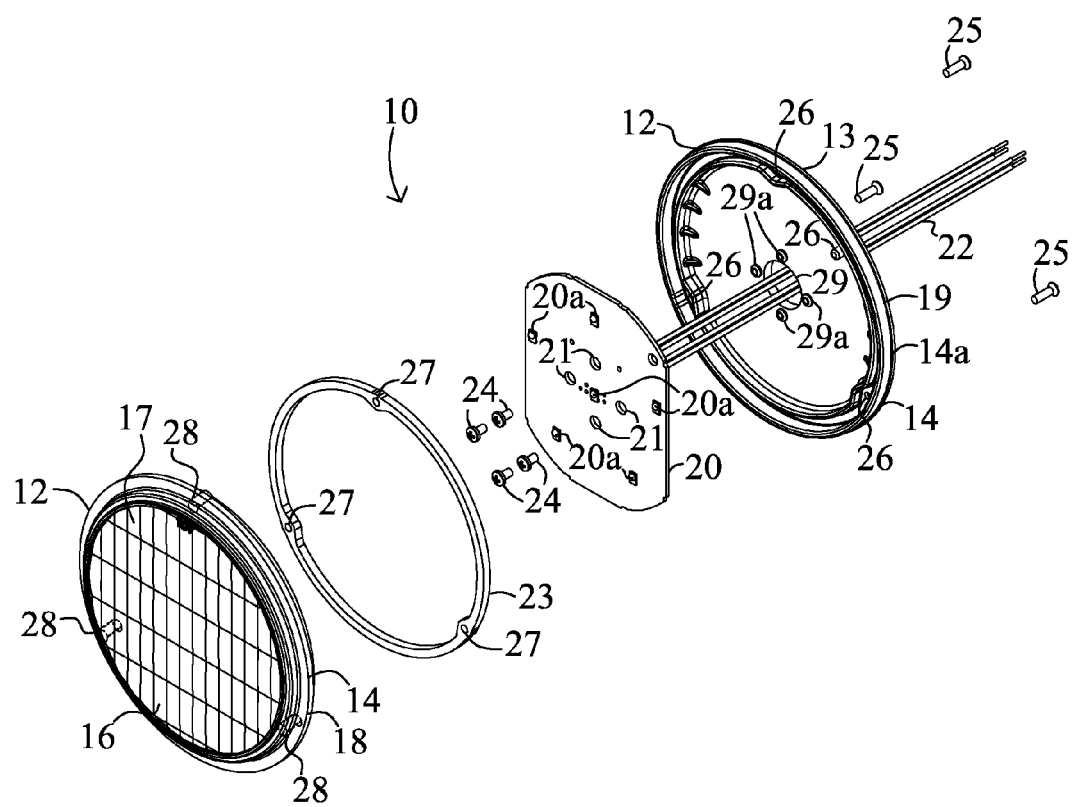
FIG. 26 is an exploded view of lamp of FIGS. 1-12 without any mounting member.
Figure 27:
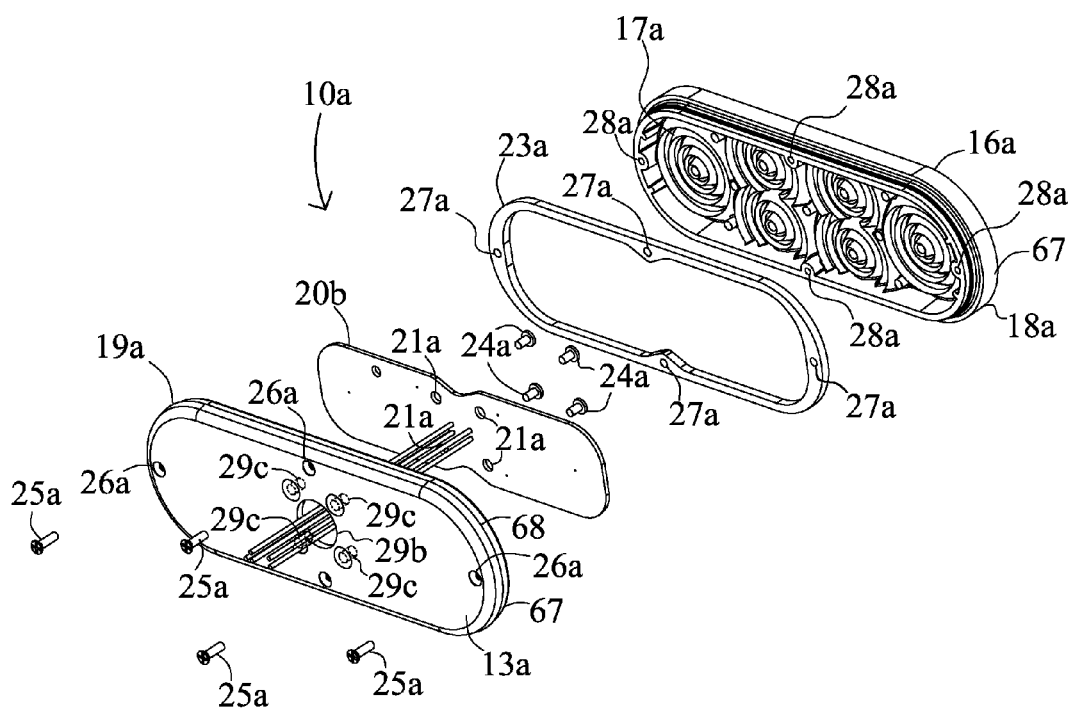
FIG. 27 is an exploded view of lamp of FIGS. 13-25 without any mounting member.

Referring to FIGS. 1, 5, and 9, a lamp 10 is shown having a round shaped housing 12 with a base 13, an outer periphery provided by sides 14, and a front surface 16 providing lens or lens elements 17 through which light is projected from the lamp. The assembly of the lamp is shown in more detail in FIGS. 4, 8, 12, and 26. The housing 12 is an assembly of an upper housing portion 18 with front surface 16, and a lower housing portion 19 providing base 13. Sandwiched between portions 18 and 19, which mate along the edges thereof, is a circuit board 20 having an array of light sources 20a, such as LEDs, with electronics coupled to wires 22, and a gasket member 23 of flexible elastomeric material, such as rubber. Each light source 20a should be disposed to provide light to a lens element 17, such as a Fresnel lens, along front surface 16. Such Fresnel lens may be similar to lens elements 17a as shown in FIG. 27. However, front surface 16 may have other optics for desired shaping of light from light sources 20a. For example, wires 22 connect to circuit board 20 to provide power and/or control to light sources 20a. Lens or lens elements 17 and light sources 20a provide the optical system of lamp 10. As best shown in FIG. 26, screws 24 are received in holes 21 along circuit board 20 to mount the circuit board into threaded holes 29a of lower portion 19. Screws 25 are received through holes 26 and 27 of lower portion 19 and gasket member 23, respectively, and tightened in threaded holes 28 of upper portion 18, to complete the assembly of housing 12. When assembled, wires 22 extend through an opening 29 in lower housing portion 19. Gasket member 23 provides a seal between upper and lower portion 18 and 19. Light sources 20a are of wattage which does not generate enough heat that would require a heat sink in housing 12. The assembled housing 12 has an exterior flange, projecting ridge, or step 14a along sides 14 of lower housing portion 19, as best shown in the FIGS. 4 and 8. The upper housing portion 18 along with integrated lens or lenses 17, and lower housing portion 19, may be made of molded plastic material.

Lamp 10 is thin, such as for example having a height from its base 13 to front surface 16 of ⅞ inches, with housing 12 being ¾ of that height, and lens or lens elements 17 along front surface 16 extending a height of ⅛ inches. Housing 12 for example may have a diameter of 4.4 inches, but other diameters may be used. The thinness of lamp 10 is enabled by avoiding the need for a heat sink in housing 12. For example, lamp 10 may be of PAR 36 type lens, such as shown, for example, in U.S. Design patent application Ser. No. 29/374,905, now U.S. Pat. No. D693,035, but other lenses may be used to provide the desired projected illumination from the lamp. The shape of the housing (e.g., thickness and outer sides) is such that it may be received in one of multiple mounting members (or fixtures) 30a, 30b, and 30c, as described below in connection with FIGS. 1-4, 4A, 5-8, and 9-12, respectively.

Figure 3:
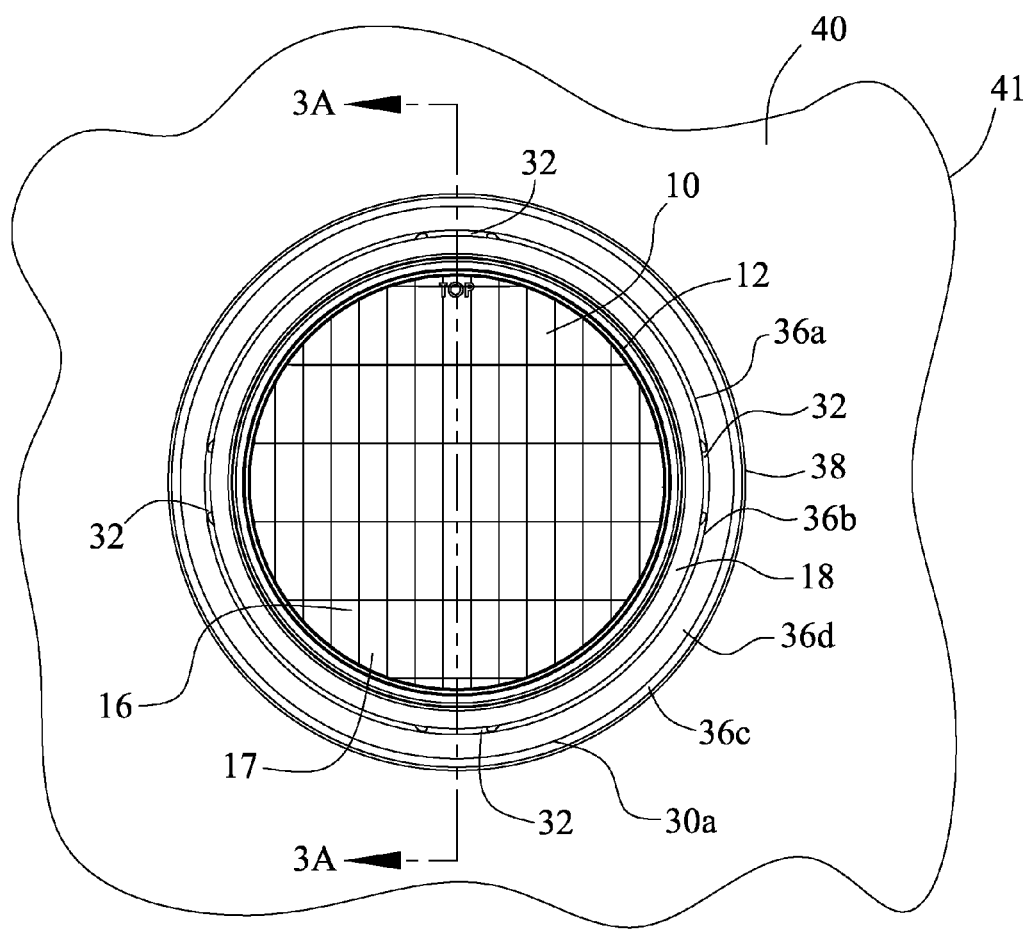

Referring to FIGS. 1-4, mounting member 30a is shown for enabling on-surface mounting mode of lamp 10 so that it lies flush onto an exterior surface 40 of a vehicle body wall 41. Mounting member 30a represents a rigid tray, such of molded plastic material, having a bottom wall 36a which meets inner or interior wall 36b, and an outer or exterior wall 36c which meets interior wall 36b along a rounded edge 36d at the front end of mounting member 30a. The outer wall 36c may be of a frusto-conical shape in that it forward slopes and tapers in diameter to round edge 36d, while interior wall 36b tapers in diameter from round edge 36d to bottom wall 36a. There is thus a general triangular cross-sectional shape along walls 36b and 36c with an open ended cavity there between, as best shown in FIG. 4.

Figure 4A:
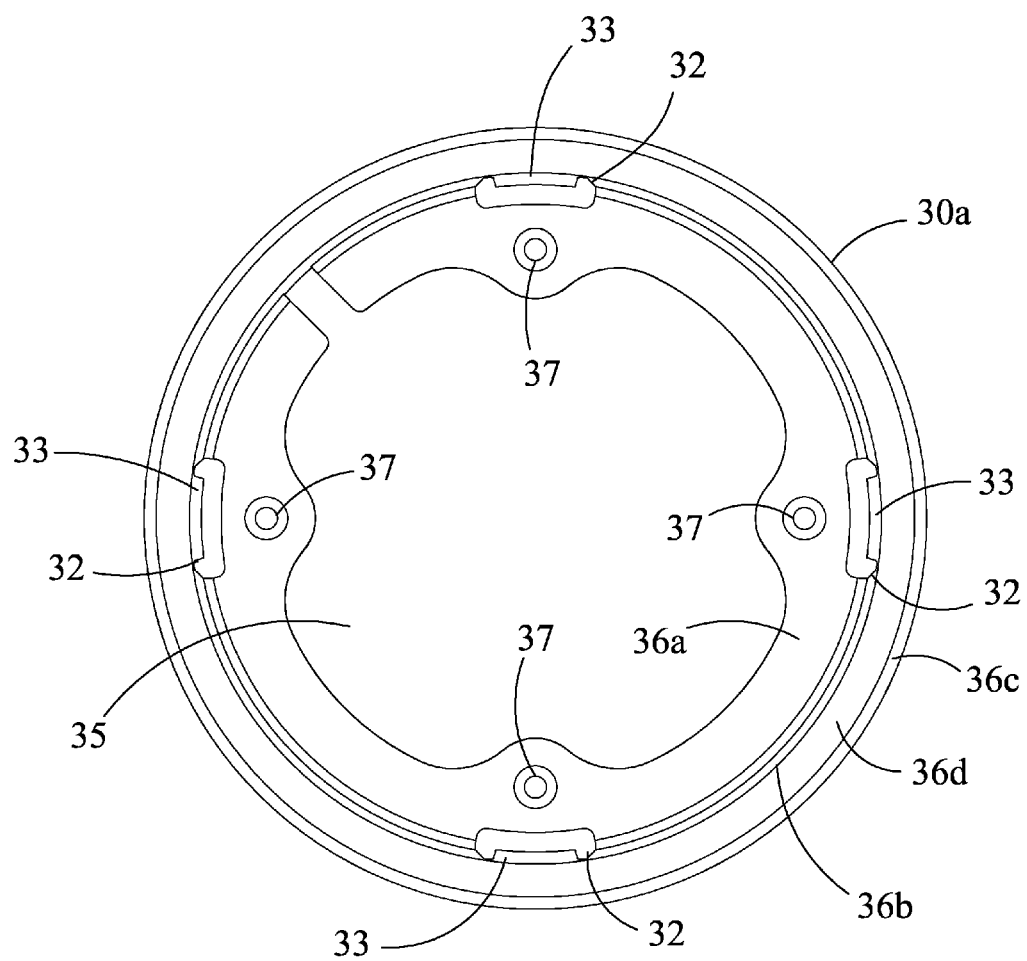
FIG. 4A is a front view of the mounting member of FIGS. 1-4 without the housing of the lamp.

The surface of mounting member 30a along interior wall 36b is sized to receive sides 14 of housing 12 and retained therein by clips (or clip members) 32 to capture housing 12 along portions of its flange 14a as shown in FIG. 4. A front view of mounting member 30a is shown in FIG. 4A, showing for example four clips 32 spaced at different locations along wall 36a. Each clip 32 has an inwardly extending tab portion 33 which is downwardly sloped. The diameter of member 30a along interior wall 36b is larger than the outer diameter of lamp housing 12 so as to facilitate engagement of clips 32 of housing 12 when received in mounting member 30a. As shown in FIG. 1, a pad 34, such as of foam material, is placed along the interior surface of bottom wall 36a of mounting member 30a so as to provide a forward bias onto base 13 so that tab portion 33 of each of clips 32 lies against flange 14a when housing 12 is received in mounting member 30a.

For example, outer wall 36c may be 5.1 inches in diameter at lower end of mounting member 30a and 4.9 inches in diameter at round edge 36d, while interior wall 36b may be 4.5 inches in diameter at rounded edge 36d, and 4.4 inches in diameter when meeting bottom wall 36a, where walls 36a-c may each be 1/16 inches thick. However, other dimensions may be used if desired so long as lamp 10 can engage clips 32 when received in member 30a.

Prior to placement of lamp 10 in mounting member 30a, the mounting member 30a is disposed over surface 40 with a pad 38 of flexible elastomeric material, such as rubber, between surface 40 and exterior surface of bottom wall 36a of mounting member 30a. The outer diameter of pad 38 is preferably the same, or slightly larger than, the outer diameter of mounting member 30a at lowest end of outer wall 36c, as shown in FIGS. 1 and 4. The pad 38 provides sealing material between the back of mounting member 30a and surface 40. Fasteners provided by screws 38a and nuts 38c are used to install mounting member 30a with pad 38 onto surface 40. Four screws 38a are then received via holes 37 in bottom wall 36a of mounting member 30a, and holes 38b in pad 38, into holes 39a drilled into surface 40, and retained by nuts 38c (see FIGS. 1 and 4). Lamp 10 is placed in mounting member 30a until flange 14a passes and pushes outwardly upon inwardly extending tab portions 33 of clips 32 until such portions of flange 14a facing tab portions 33 are captured under tab portions 33 under the forward bias of compressed pad 34. When mounted, wires 22 extend through an opening 34a of pad 34, an opening 35 of mounting member 30a, an opening 38d of pad 38, and then an opening 39b drilled in surface 40.

The completed mounting of lamp 10 with mounting member 30a, along with pads 34 and 38, is shown in FIGS. 3, and 4. A portion of lens or lens elements 17 of front surface 16 may extend from mounting member 30a, if desired. In this manner, lamp 10 is flush mounted onto (and over) surface 40 with pad 38 there between for on-surface mounting with a bezel mounting appearance.

Figure 6:
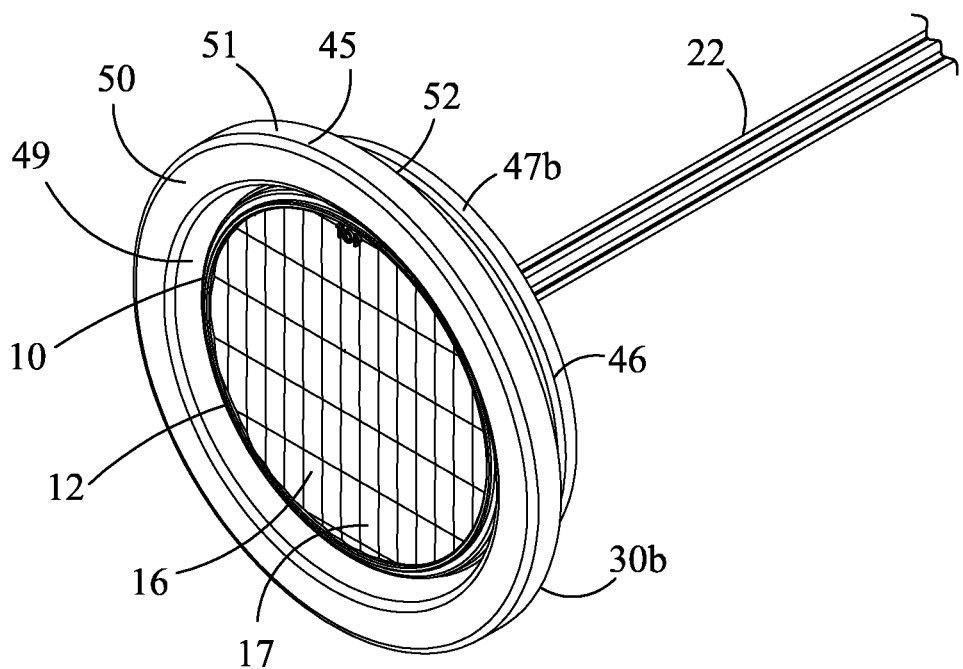
FIGS. 6 and 7 are perspective and front views, respectively, showing the assembly of the lamp received in the mounting member of FIG. 5, in which the surface of the vehicle is not shown in FIG. 6.
Figure 7:
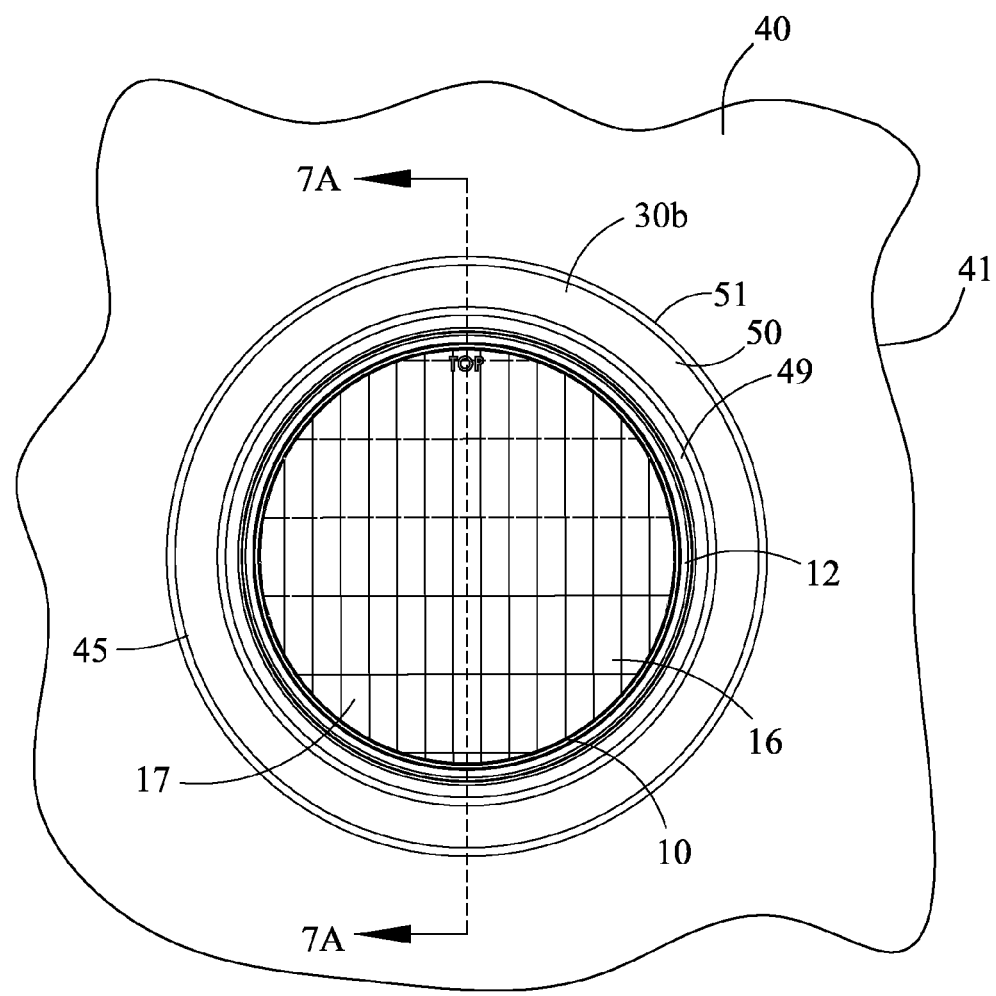

Referring to FIGS. 5-8, mounting member 30b is shown for enabling inset mounting mode of lamp 10 in a drilled hole or opening 42 extending through exterior surface 40 of a vehicle body wall 41. Mounting member 30b is a generally cylindrical shaped grommet of flexible elastomeric material, such as rubber. For example, mounting member 30b may be a Model 60 Mounting Grommet manufactured by Truck-Lite Company LLC, but grommets of other manufacturers may be used which are similarly adapted to the shape of housing 12. Mounting member 30b has a lower portion 44 and a upper portion 45, where lower portion 44 is insertable into opening 42 and upper portion 45 extends to frame about opening 42 along surface 40. Lower portion 44 has a ledge 47a which presses against side wall 43 of hole 42 to retain mounting member 30b in opening 42. An exterior ridge 47b may also be provided along lower portion 44 to frictionally engage side wall 43 if thicker than shown in FIG. 8. Upper portion 45 has three walls 49, 50, and 51 which provide a frame upon surface 40. Walls 49 and 51 are generally parallel to each other, and wall 50 connects walls 49 and 51 and is generally perpendicular thereto, as best shown in FIG. 8. Wall 49 of upper section 45 extends continuously with the surface of an interior wall 48 of lower section 44. Wires 22 from lamp 10 extend through opening 54 of mounting member 30b when lamp 10 is received in mounting member 30b.

As shown in FIG. 8, mounting member 30b is sized along its interior walls 48 and 49 so as to frictionally engage housing 12 of lamp 10 when received therein so that flange 14a engages wall 48 of lower portion 44, and base 13 of the lamp is disposed along interior of bottom ledge or wall 46 of mounting member 30b. Mounting member 30b with lamp 10 received therein is pressed into opening 42 so that its ridge 47b and ledge 47a deform to engage the opening's wall 43, and edge 52 from wall 51 of the upper portion 45 lies against surface 40 providing an annual cavity 53 between walls 49-51, thereby retaining the assembly of the mounting member 30b and lamp 10 in opening 42 inset in surface 40 and also sealing opening 42 from the external environment. The completed mounting of lamp 10 with mounting member 30b is shown in FIGS. 6, 7, and 8, where wall 41 is removed in FIGS. 6 and 7.

Referring to FIGS. 9-12, mounting member 30c is shown for also enabling inset mounting mode of lamp 10 in a drilled hole or opening 42 extending through exterior surface 40 of a vehicle body wall 41. Mounting member 30c is a circular bracket which may be made of stainless steel, such bracket may be for example Model No. 97334 Security Flange manufactured by Truck-Lite Company LLC. Mounting member 30c has a lower surface 55 having legs 58 extending there from generally perpendicular with respect to the lower surface 55. Each leg 58 has an interior clip member 60 which captures the rear of lamp housing 12, i.e., at a location along the outer periphery of base 13, when the lamp 10 is pressed into mounting member 30c from the back side thereof to retain lamp 10 to mounting member 30c. Each leg 58 further has two exterior clip members 61 which clip under the back surface 62 of wall 41 below opening 42 when the mounting member 30c with lamp 10 received therein is pressed into opening 42 of surface 40.

When the assembly of lamp 10 and mounting member 30c is received in opening 42, lower surface 55 of the mounting member 30c partially lies flat against surface 40 about opening 42, i.e., over radial distance between legs 58 and the outer edge 57 of the mounting member 30c. The upper surface 56 of mounting member 30c then lies generally parallel to the surface 40 providing a trim appearance with the lamp inset surface mounting to the vehicle body wall 41.

Although the above round housing 12 is described above, other lamp housing shapes may be provided which can be similarly received in mounting members 30a, 30b, and 30c adapted to the particular housing shape. For example, a lamp 10a with an oval housing 12a may be provided with an upper housing portion 18a mating a lower housing portion 19a, lens or lens elements 17a along a front surface 16a, sides 67, a base 13a, and a flange, ridge or step 68, such as shown in FIGS. 13-25 which is mountable in oval mounting members 30d, 30e, and 30f in the same manner as described above for mounting members 30a, 30b, and 30c, respectively, as in the case of a round lamp housing 12, and thus have like numerals.

Figure 17:
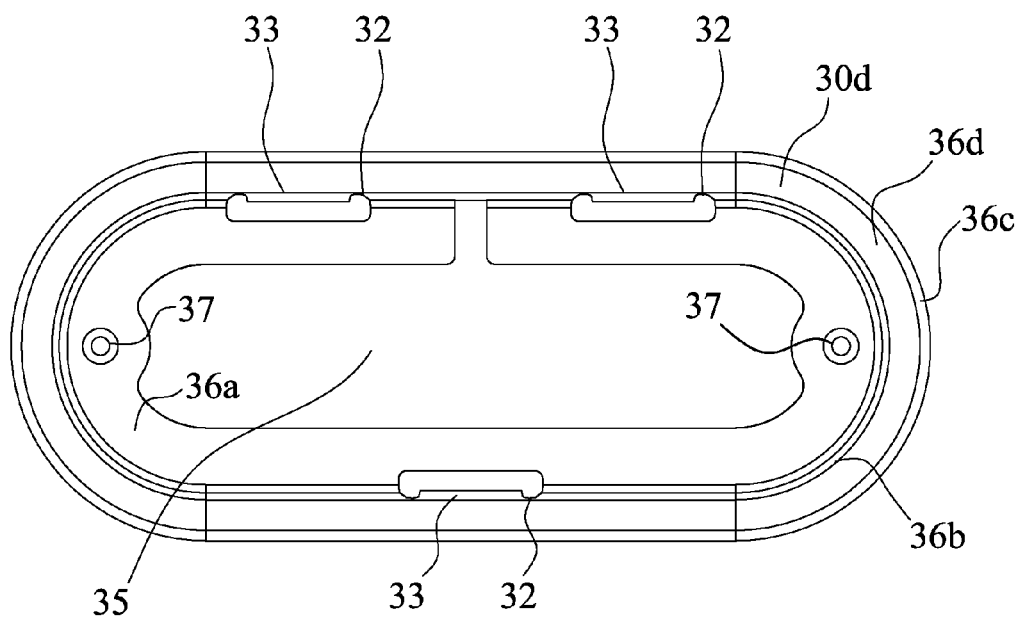
Figure 18:
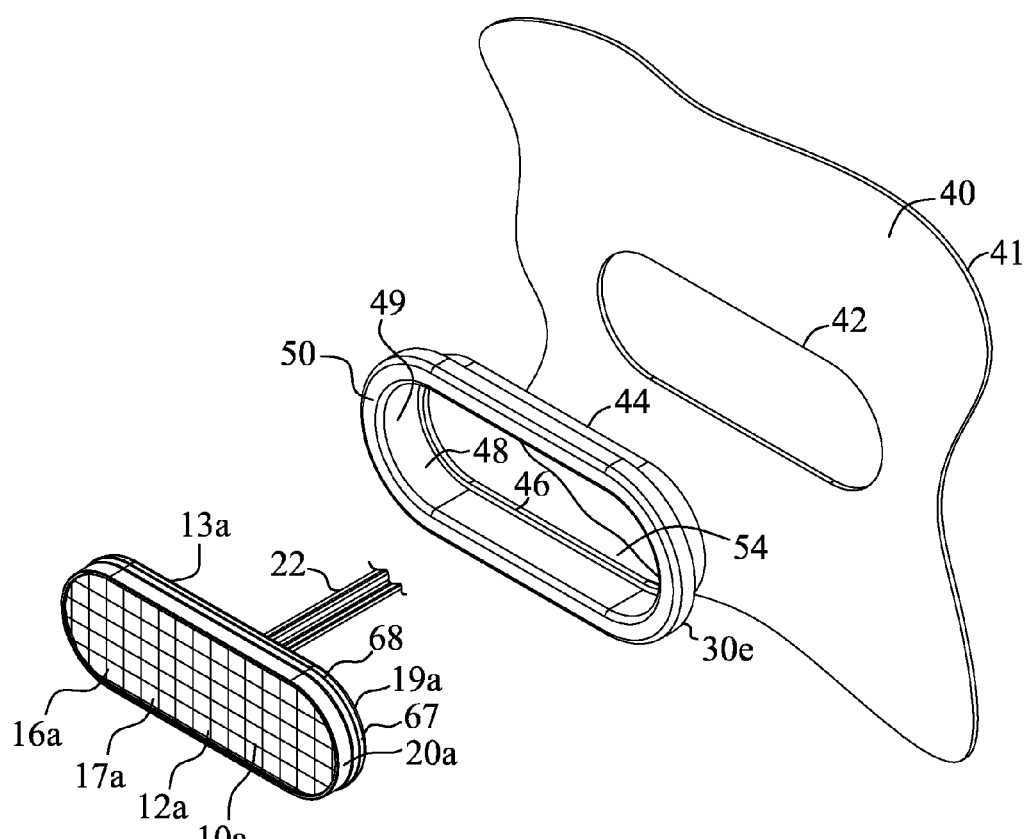
FIGS. 18-21 are similar views to FIGS. 5-8, respectively, showing another mounting member which is similar to the inset mode mounting member of FIGS. 5-8 for an example of a oval shaped housing for the lamp.
Figure 19:
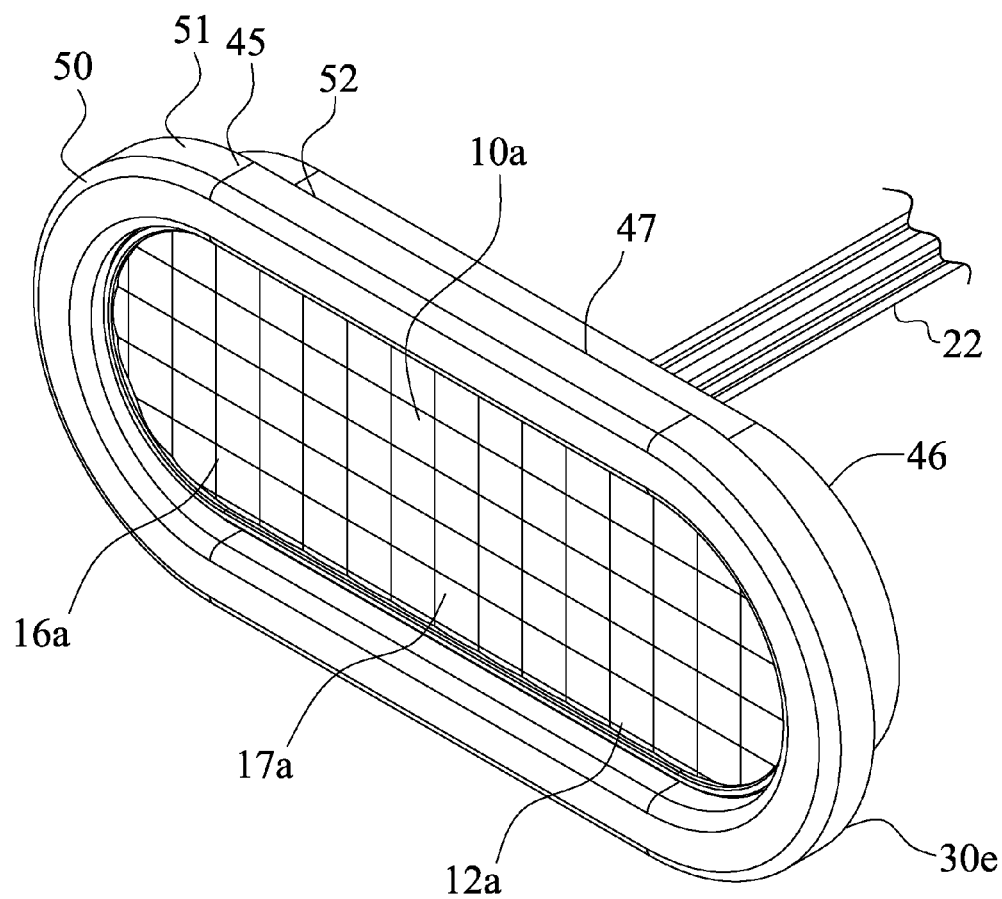
Figure 20:
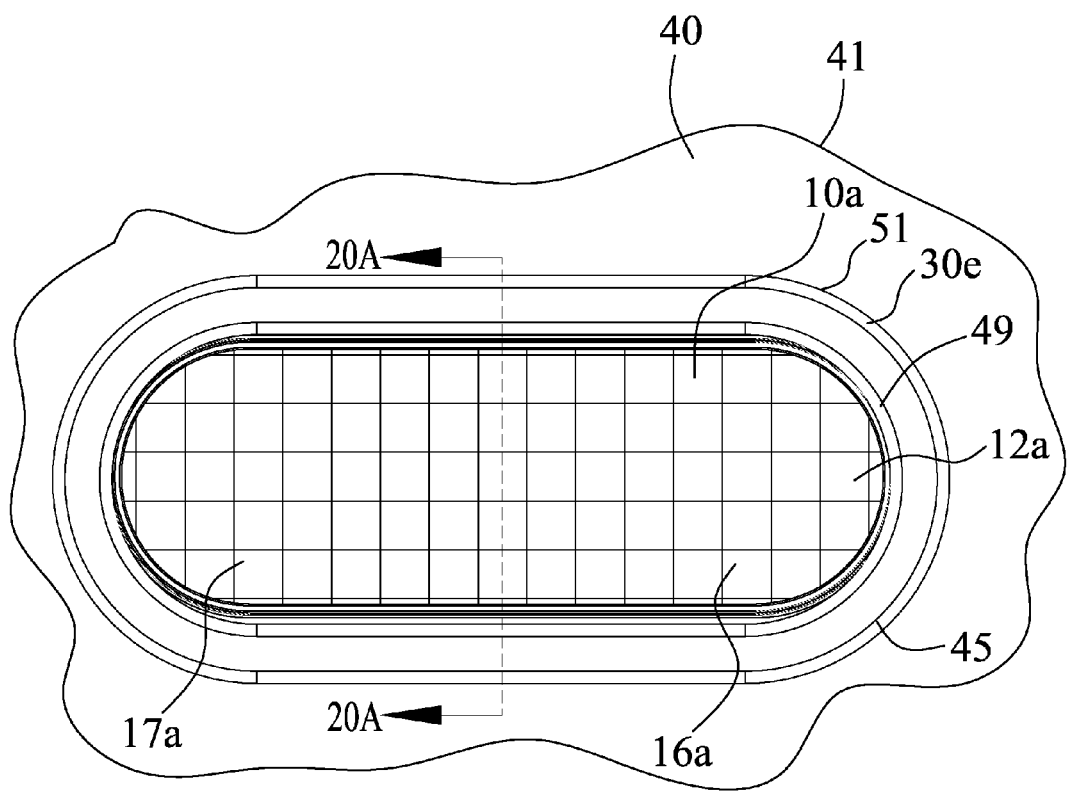
Figure 21:
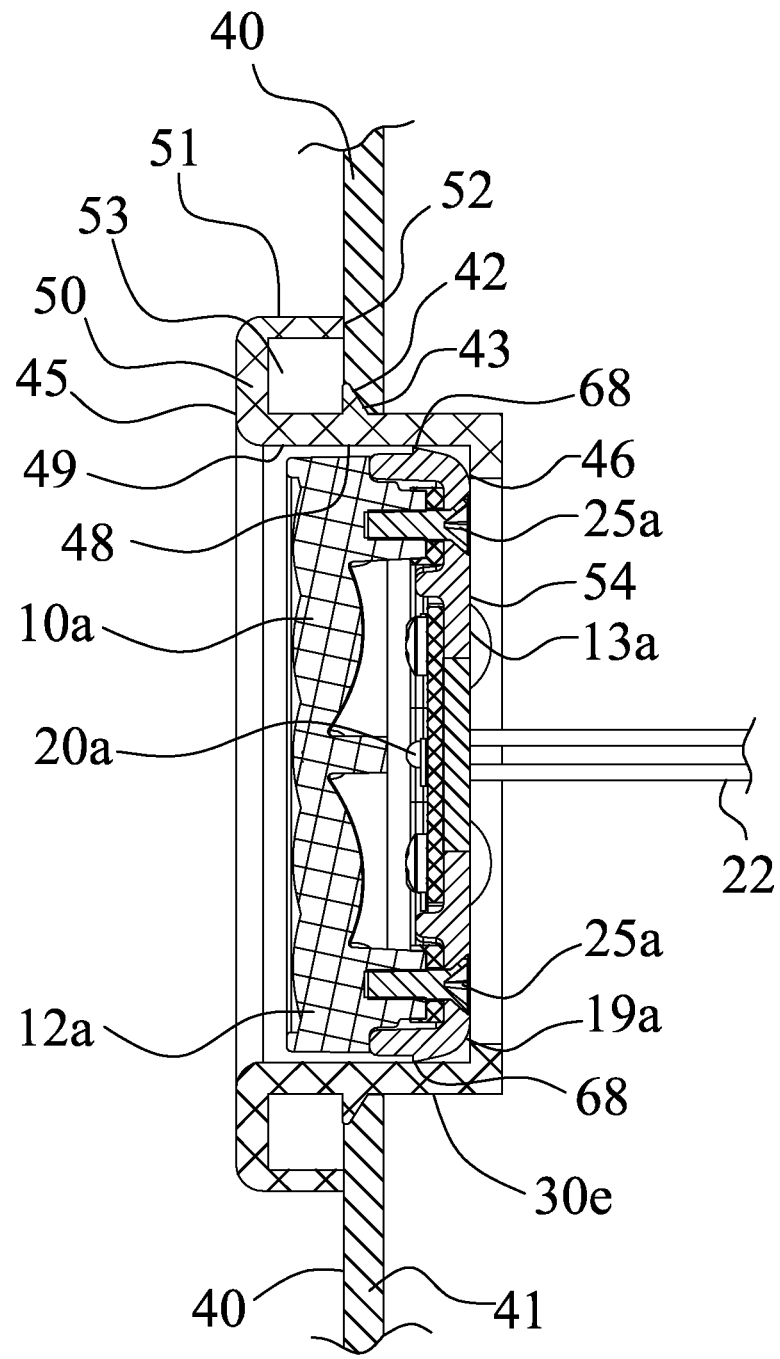

In particular, mounting member 30d provides an oval tray for on-surface mounting lamp 10a with oval shaped pads 34 and 38 by fasteners 38a and 38c, as shown in FIG. 13-17, in the same manner as described earlier for mounting member 30*a*. A flange 68 is provided along lamp 10*a* and provides the same function as flange 14*a* of lamp 10, such as to engage clips 32 by tab portions 33 when placed in mounting member 30*d*. However, one difference is that the number and position of clips 32 along mounting member 30*d* differ due to the oval shape of housing 12*a*. For example, three clips 32 are provided at spaced locations from each other, two along one side and one on the other side for mounting member 30*d* as shown in FIG. 17.

Mounting member 30*e* provides an oval shaped grommet of elastomeric material for receiving lamp 10*a* as shown in FIGS. 18-21 in same manner as mounting member 30*b*, but in an oval shaped opening or hole 42. Thus, when lamp 10*a* is received in mounting member 30*e*, interior wall 48 engages the outer sides of housing 12*a*, including flange 68.

Figure 22:
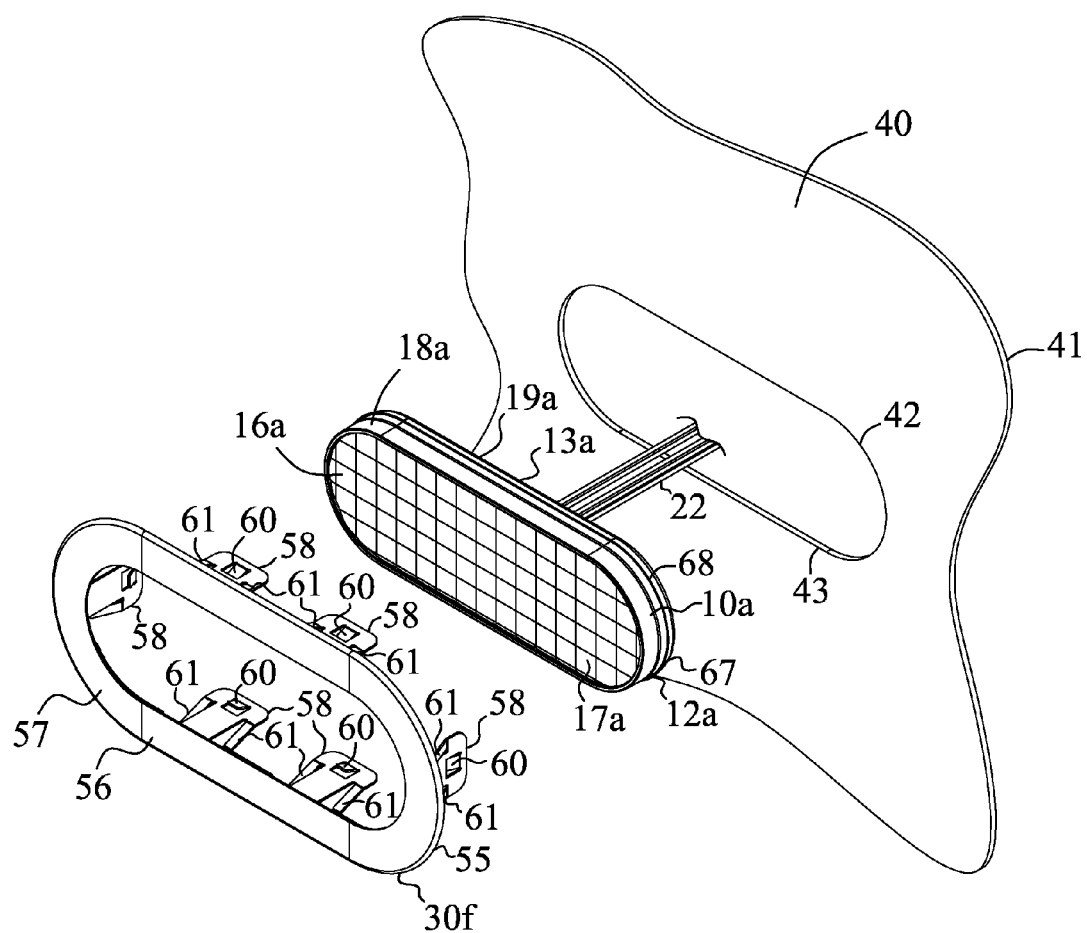
FIGS. 22-25 are similar views to FIGS. 9-12, respectively, showing another mounting member which is similar to the inset mode mounting member of FIGS. 9-12 for an example of a oval shaped housing for the lamp.
Figure 23:
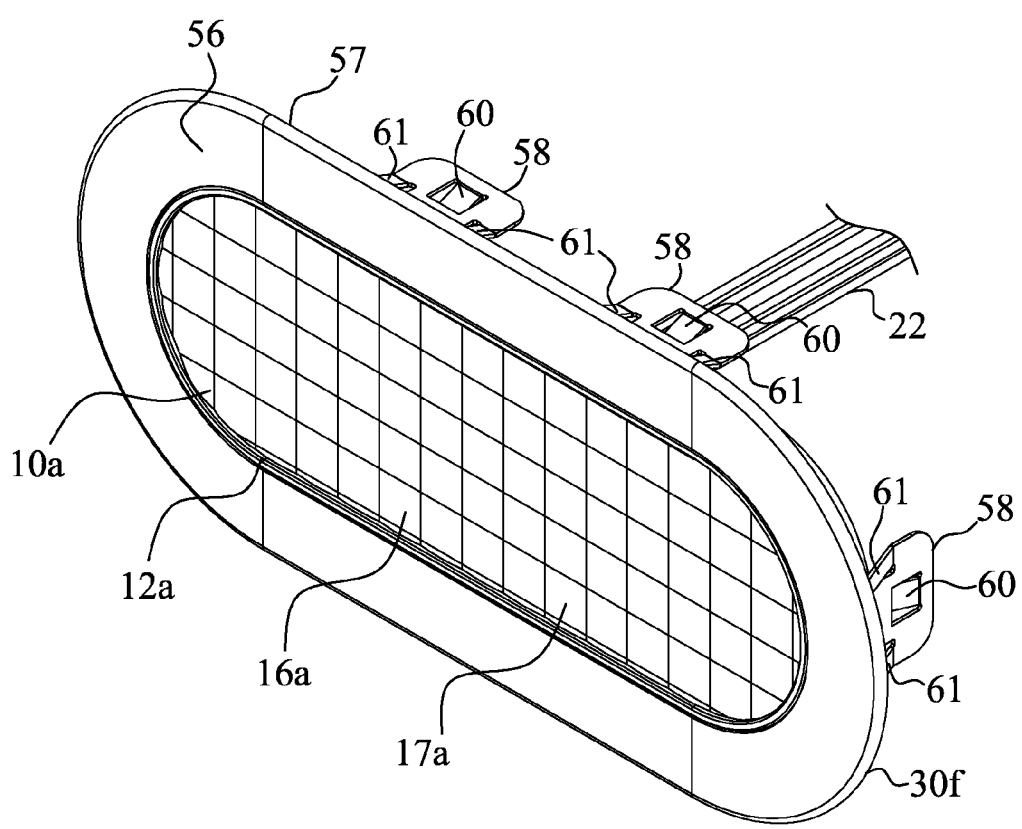
Figure 24:
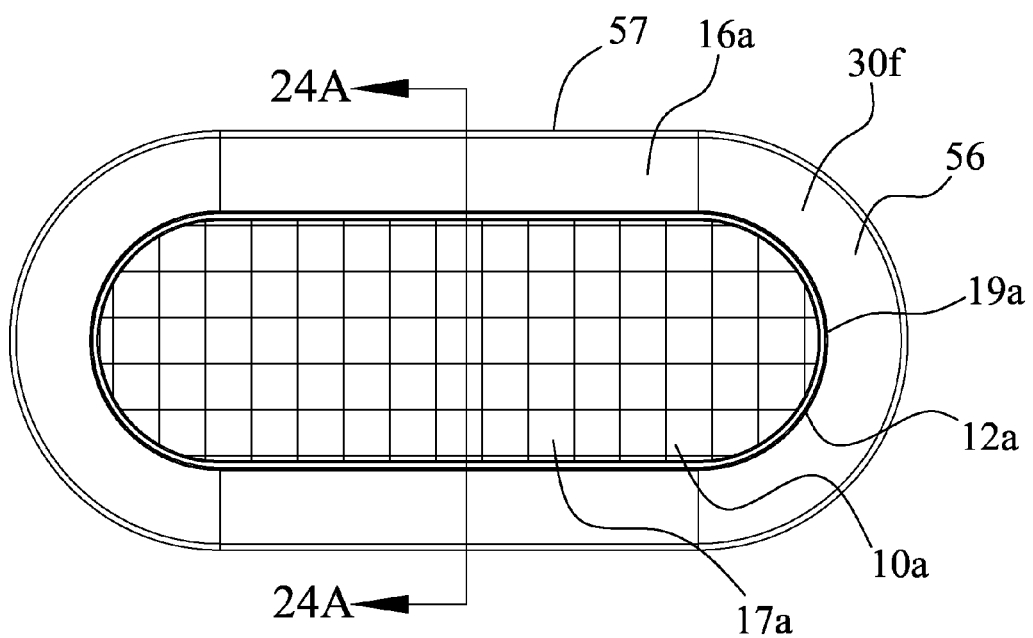
Figure 25:
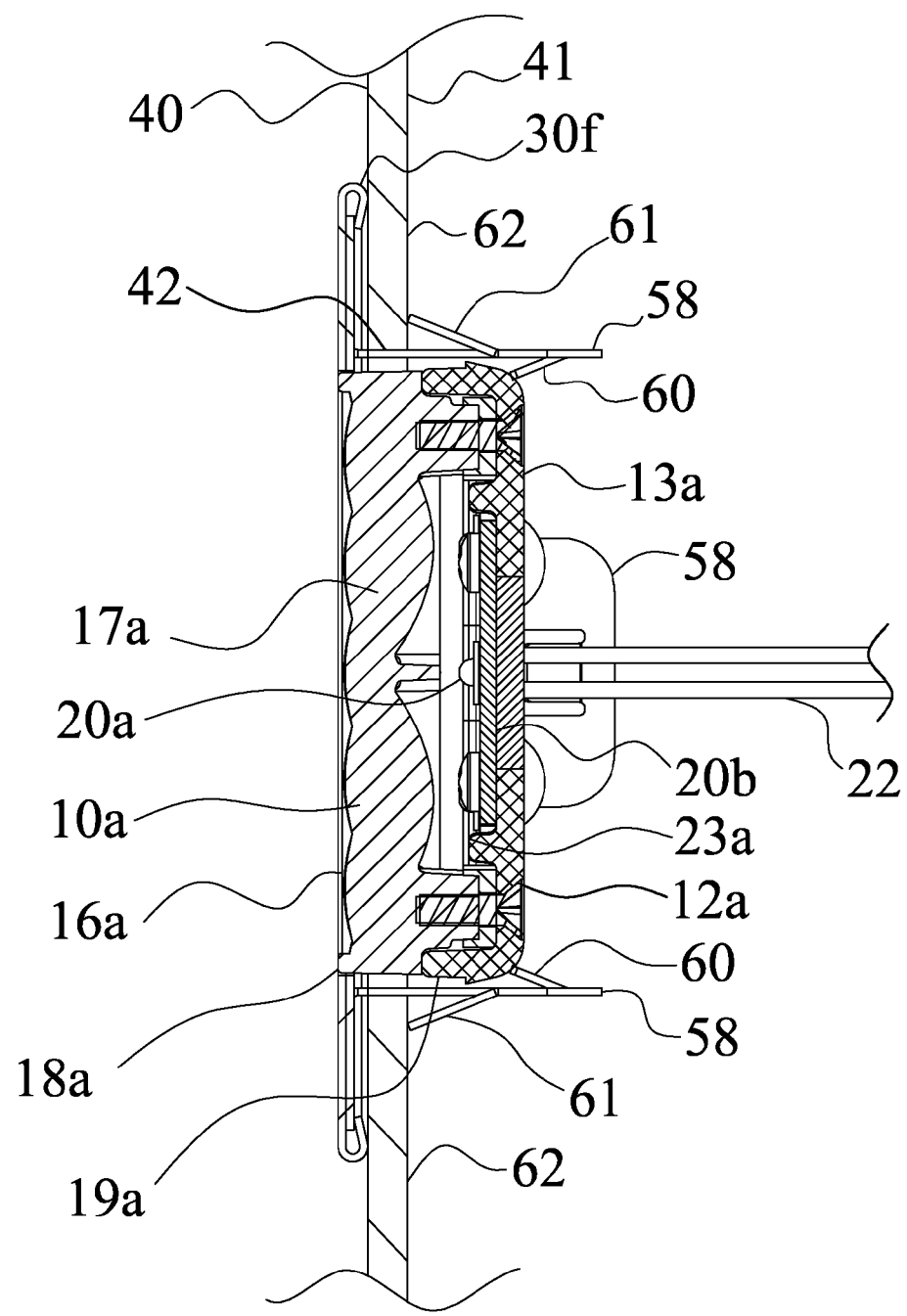

Mounting member 30*f* provides an oval bracket for inset mounting lamp 10*a* as shown in FIGS. 22-25 in the same manner as mounting member 30*c*, but in an oval shaped opening or hole 42. However, one difference is that the number and position of legs 58 along mounting member 30*f* differs due to the oval shape of housing. For example, six legs 58 are provided at spaced locations from each other as shown in FIG. 22.

The assembly of lamp 10*a* is shown in FIG. 27, and other than difference in shape of components, such assembly is similar to that described earlier for lamp 10. In particular, housing 12*a* is an assembly of upper housing portion 18*a* with front surface 16*a*, and lower housing portion 19*a* providing base 13*a*. Flange 68 extends along the outer periphery of the surface of lower housing portion 19*a*. Sandwiched between portions 18*a* and 19*a*, which mate along the edges thereof, is a circuit board 20*b* having an array of light sources, such as LEDs, facing front surface 16*a* with electronics coupled to wires 22, and a gasket member 23*a* of flexible elastomeric material, such as rubber. The light sources on circuit board 20*b* are the same as light sources 20*a* shown in FIG. 26 and are spaced from each other to direct light to lens elements 17*a*, which may be Fresnel lenses. However, front surface 16*a* may have other optics for desired shaping of light from light sources 20*a*. Screws 24*a* are received in holes 21*a* along circuit board 20*b* to mount the circuit board into threaded holes 29*c* of lower portion 19*a*. Such attachment of the circuit board to lower housing portion 19*a* may be the same as screws 24 via holes 21 to threaded holes 29*a* of lamp 10. Screws 25*a* are received through holes 26*a* and 27*a* of lower housing portion 19*a* and gasket member 23*a*, respectively, and tightened in threaded holes 28*a* of upper housing portion 18*a*, to complete the assembly of housing 12*a*. When assembled, wires 22 extend through an opening 29*b* in lower housing portion 19*a*. The upper and lower portions 18*a* and 19*a* may be made of molded plastic.

From the foregoing description it will be apparent that there has been provided a system for mounting a lamp with respect to a surface along a vehicle. Variations and modifications herein this described system, apparatus, and method will undoubtedly suggest themselves to those skilled in the art. Accordingly the foregoing description should be taken as illustrative and not in a limiting sense.

The invention claimed is:

1. A system for mounting a lamp with respect to a surface of a vehicle comprising:
   a plurality of different mounting members;
   at least a first one of said mounting members being mountable upon a surface of a vehicle to dispose an entirety of a housing of a lamp over said surface of the vehicle when received in said first one of said mounting members; and
   at least a second one of said mounting members being mountable at least partially in an opening when present along a surface of a vehicle, wherein each of said plurality of different mounting members engages a common shape of said housing of said lamp which comprises a base, a front, and sides extending between said front and said base, in which said housing entirely encloses a plurality of light sources that produce illumination outputted via said front of said housing, and one of said first one of said mounting members or said second one of said mounting members is selected for mounting said lamp to said surface.

2. The system according to claim 1 wherein each of said mounting members has means for engaging an outer periphery of said housing to retain said housing in the mounting member.

3. The system according to claim 1 wherein said housing further comprises one or more common features for engagement of said housing by said first one and said second one of said mounting members when said housing is received therein.

4. The system according to claim 1 wherein each of said mounting members is sized to receive said housing of the lamp, and one of a deformable surface or clips for engaging a flange or portions thereof extending along said housing to retain said housing in the mounting member.

5. The system according to claim 1 wherein said first one of said mounting members is a tray fixable upon the surface of a vehicle by one or more fasteners.

6. The system according to claim 5 wherein said tray has an interior surface having clip members spaced from each other along said interior for engaging a flange at different locations along said housing of said lamp for retaining said housing in said tray.

7. The system according to claim 6 wherein said tray has a deformable member between a bottom of the tray and the base of said housing of said lamp for biasing said housing forward to facilitate said clip members engagement with said flange.

8. The system according to claim 5 wherein said tray is of rigid material.

9. The system according to claim 5 further comprising a flexible member between said tray and the surface of said vehicle when fixed upon the surface of said vehicle.

10. The system according to claim 5 wherein said tray has a bottom with an opening through which one or more wires of said lamp extend, said one or more wires extend through a hole in said surface of said vehicle when said tray is fixed upon the surface of the vehicle.

11. The system according to claim 1 wherein said second one of said mounting members is a grommet or a bracket.

12. The system according to claim 1 wherein said second one of said mounting members is a grommet of elastomeric material which receives and frictionally engages said housing of said lamp, said grommet having a lower portion with an outer surface that frictionally engages said opening when present along the surface of a vehicle, and an upper portion which provides a frontal frame about said opening when said lower portion is received in said opening.

13. The system according to claim 1 wherein said second one of said mounting members is a bracket having rearwardly extending legs which extend through said opening, said legs each having inwardly facing clip members for engaging different locations along a back of housing, and said legs each having outward facing clip members which engage the vehicle at different locations about said opening and retain said bracket in said opening, said bracket having a frontal frame about said opening.

14. The system according to claim 1 wherein said front has a surface with one or more lenses, and said plurality of light sources provides said illumination to said one or more lenses to project light from said lamp.

15. The system according to claim 1 wherein said first one of said mounting members is rigid and has an interior surface having clip members for engaging features along said housing of said lamp for retaining said housing in said first one of said mounting members, and said first one of said mounting members is fixable upon the surface of a vehicle by one or more fasteners.

16. The system according to claim 15 wherein said second one of mounting members is of elastomeric material having an interior surface which frictionally engages an outer periphery of said housing of said lamp and exterior surface which frictionally engages the opening when present along the surface of the vehicle.

17. The system according to claim 16 further comprises a third one of said mounting members represents a bracket having interior clip portions for engaging said housing and exterior clip portions for engaging the surface about said opening when present in the surface of the vehicle, and one of said first, second, and third ones of said mounting members is selected for mounting said lamp to said surface.

18. The system according to claim 1 wherein said housing is round or oval along said sides.

19. The system according to claim 1 wherein said first of said mounting members is mountable in a fixed position upon said surface of the vehicle prior to receiving said housing of the lamp.

20. A lamp mountable to a surface of a vehicle comprising:
a housing having a base, a front with one or more lenses, and sides extending between said front and base;
an optical system which is entirely enclosed in said housing to provide illumination through said one or more lenses; and
said housing having one or more features enabling said housing to engage two or more different types of mounting members in which at least one of said different types of mounting members is mountable upon a surface of a vehicle to dispose an entirety of said housing over said surface, and another of said different types of mounting members is mountable at least partially in an opening or hole when present along the surface of the vehicle.

21. An apparatus for mounting a lamp onto a surface of a vehicle comprising:
a tray having a bottom and sides;
members within said tray for engaging a housing of a lamp and retaining said housing in said tray;
one or more fasteners for fixing said tray onto a surface of a vehicle in which an entirety of said housing of said lamp is disposed over the surface of the vehicle when said housing is retained in said tray, wherein said tray is configured to retain said housing which comprises a base, a front, and sides extending between said front and said base, in which said housing entirely encloses a plurality of light sources that produce illumination outputted via said front of said housing; and
wherein said bottom of said tray has an opening through which one or more wires of said lamp are extendable.

22. The lamp according to claim 21 wherein said housing along said sides is round or oval.

23. The apparatus according to claim 21 wherein said members are clip members within said tray along said sides for engaging a flange at different locations along said housing of the lamp to retain said housing in said tray, and said apparatus further comprises a deformable member between said bottom of the tray and the base of said housing of said lamp for biasing said housing forward to facilitate engagement with said clip members.

24. The apparatus according to claim 21 further comprising a flexible member between said tray and the surface of the vehicle when fixed upon the surface of the vehicle.

25. The apparatus according to claim 21 wherein said tray is of rigid material.

26. The apparatus according to claim 21 wherein said one or more fasteners fixes said tray to the surface of the vehicle prior to placement of said housing of said lamp in said tray for engagement by said members.

* * * * *

UNITED STATES PATENT AND TRADEMARK OFFICE
CERTIFICATE OF CORRECTION

PATENT NO. : 9,676,323 B2
APPLICATION NO. : 14/198305
DATED : June 13, 2017
INVENTOR(S) : R. Michael Datz, James Cronmiller and Michael A. Barbato Page 1 of 1

It is certified that error appears in the above-identified patent and that said Letters Patent is hereby corrected as shown below:

On the Title Page

Item (73) Assignee, delete "HEADLIGHG", and insert --HEADLIGHT--.

Signed and Sealed this
Twenty-fifth Day of February, 2020

Andrei Iancu
*Director of the United States Patent and Trademark Office*